June 19, 1934.  K. G. A. BÄCKDAHL  1,963,689
STABILIZING AND SPRING CONTROLLING DEVICE
Original Filed Feb. 10, 1932   2 Sheets-Sheet 1

INVENTOR.
Karl Gustaf Alfred Bäckdahl

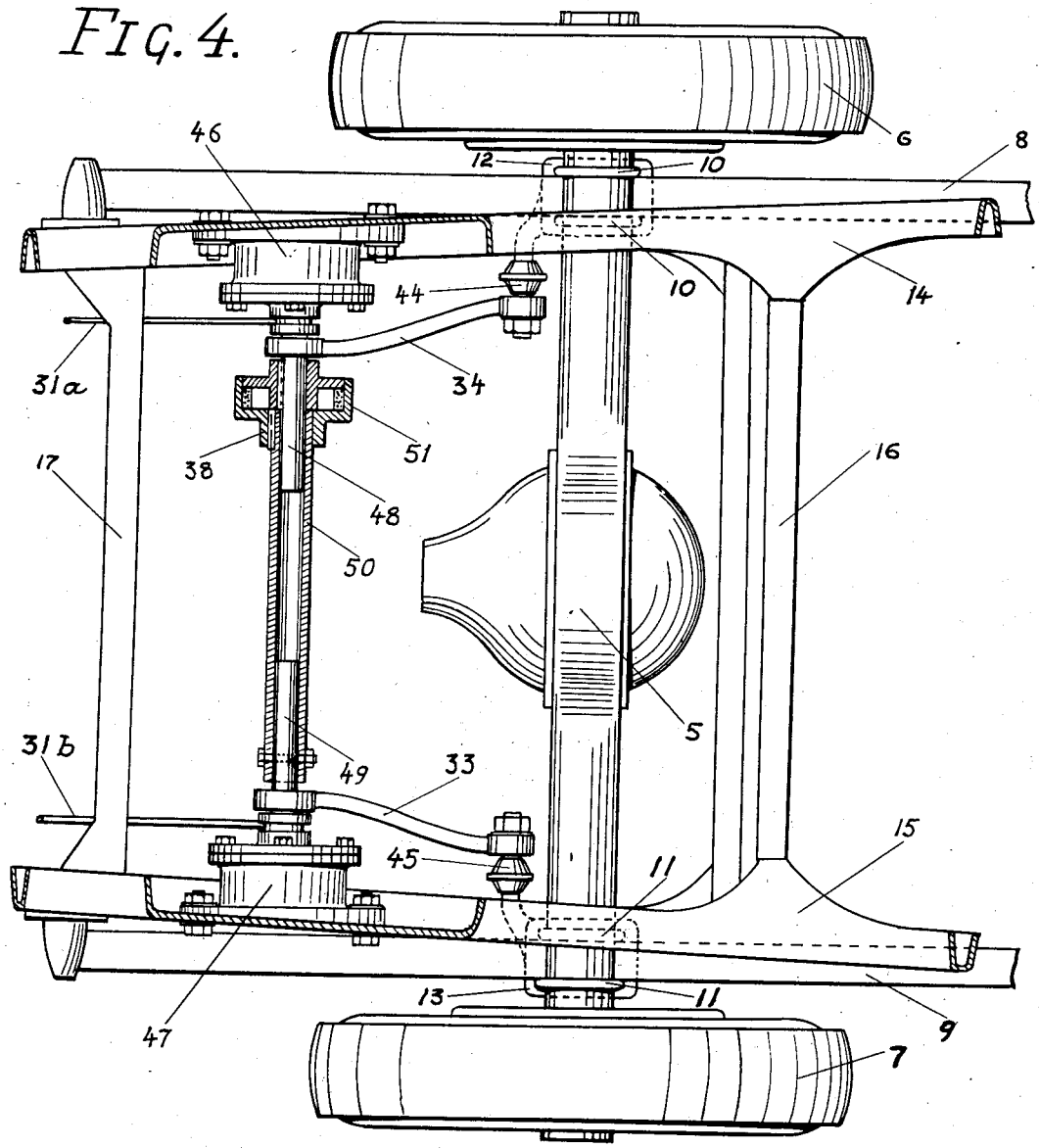

Patented June 19, 1934

UNITED STATES PATENT OFFICE 1,963,689

STABILIZING AND SPRING CONTROLLING DEVICE

Karl Gustaf Alfred Bäckdahl, Stockholm, Sweden, assignor to Packard Motor Car Company, Detroit, Mich., a corporation of Michigan Application February 10, 1932, Serial No. 592,060
Renewed August 7, 1933

15 Claims. (Cl. 267—11)

My present invention relates to stabilizing and spring controlling devices for vehicles, in which the frame or load carrying member is flexibly supported by spring suspension devices, connecting it with the axles or wheel carrying members.

An object of my invention is to provide means for preventing the vehicle frame and the body and load thereon from swaying or leaning over relatively to the axles or wheel carrying members.

Another object of my invention is to provide means for controlling the relative movements between the frame and the wheel carrying members by applying a suitable resistance to the compression as well as to the rebound of the vehicle springs, thereby serving the same purpose as two-way or double-acting shock absorbers.

A further object is the provision of means for adjusting the spring controlling action according to changes in road conditions, load, vehicle speed and temperature.

With the above and other objects in view, my invention consists in the new and useful construction, combination and arrangement of parts hereafter fully described and illustrated in the accompanying drawings showing two suitable embodiments of my invention, but it is to be understood that changes, variations and modifications coming within the scope of the matter claimed hereafter may be resorted to.

Referring to the drawings forming part of this specification:

Fig. 3 is a sectional side view of one of the flexible couplings along the line III—III in Fig. 1.

Fig. 4 is a plan view similar to Fig. 1 of another embodiment of the invention with the cross shaft shown in section.

Figure 1:
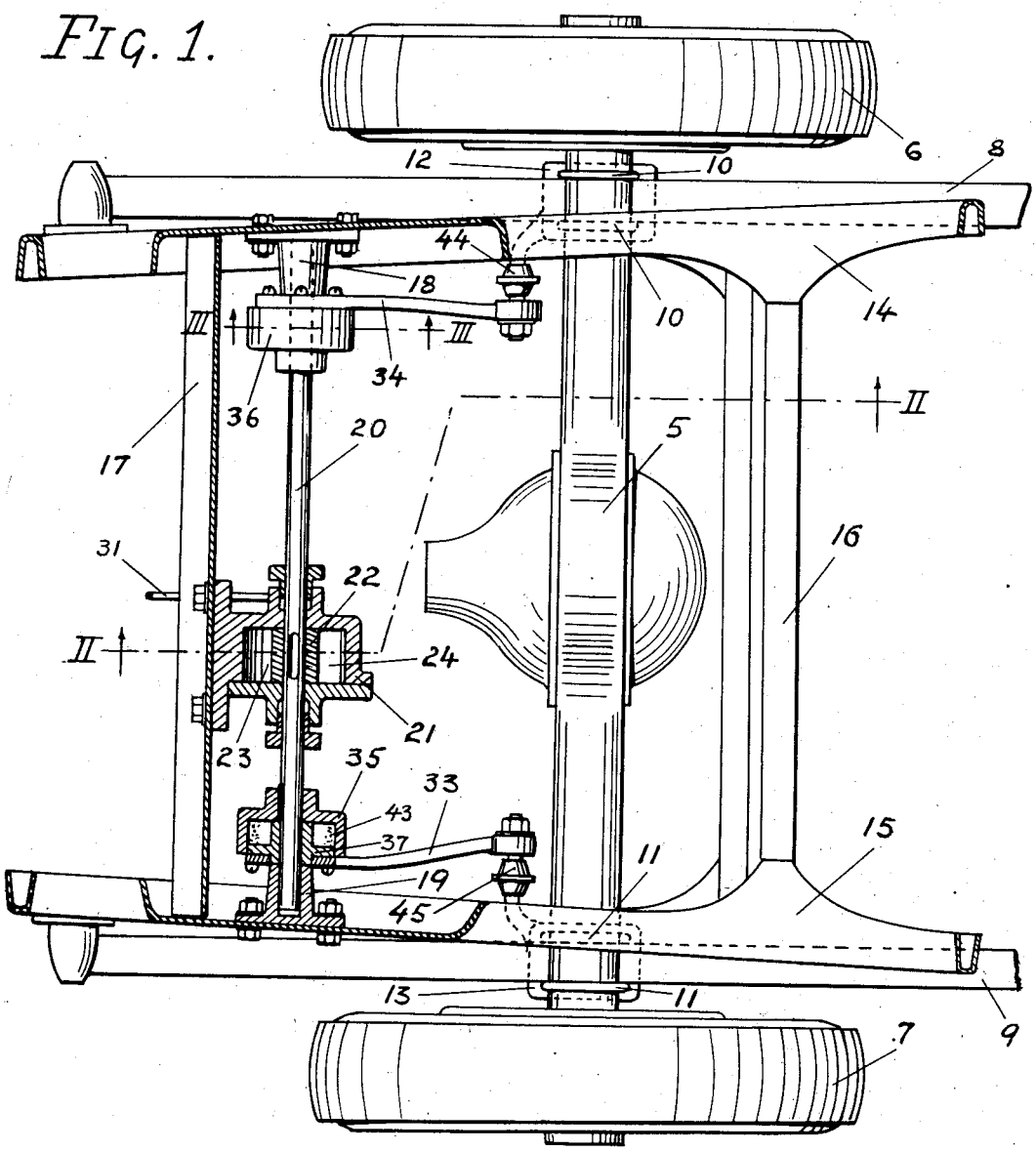
Fig. 1 is a plan view of the apparatus applied to the rear end of an automobile with the shock absorber and one of the flexible couplings shown in section along the line I—I in Fig. 2.
Figure 2:
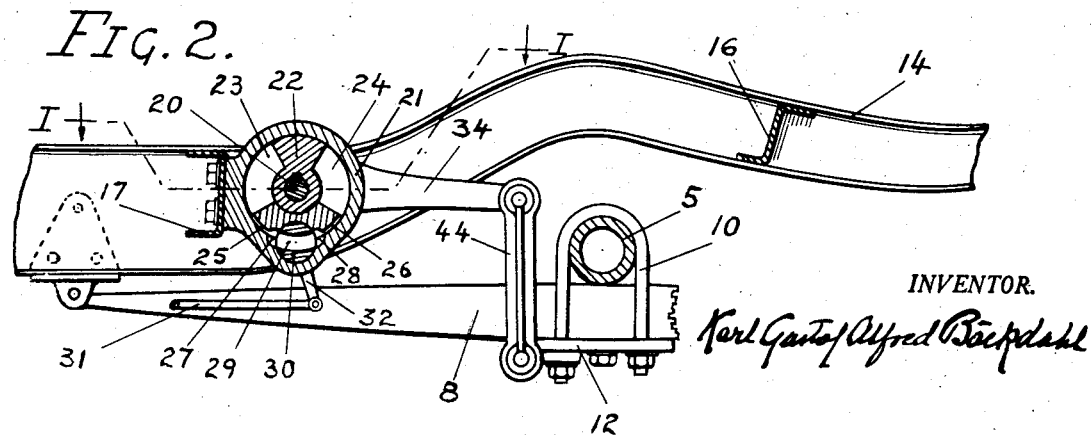
Fig. 2 is a sectional side view along the line II—II in Fig. 1.

In Figs. 1 and 2 the rear end of a motor car chassis is shown having the rear axle 5 carrying the rear wheels 6 and 7. Two longitudinal semi-elliptic springs 8 and 9 are each attached to the rear axle 5 by means of a pair of spring clips 10, 10 and 11, 11 and a clip plate 12 and 13, respectively. The springs 8 and 9 support the frame side members 14 and 15 connected with each other by cross members 16 and 17.

Journalled in bushings 18 and 19 bolted to the inside of the frame side members 14 and 15, respectively, is a cross shaft 20. Keyed to said cross shaft 20 is the vane 22 of a hydraulic double-acting shock absorber of the oscillating vane type the housing 21 of which is bolted to the cross member 17 somewhat off the centre line in order not to impede the movements of the propeller shaft (not shown). Vane 22 divides housing 21 into two separate hydraulic chambers 23 and 24 communicating with each other by means of narrow ducts 25 and 26 opening into pockets 27 and 28, respectively, which pockets register with the openings of the duct 29 in a rotary valve slide 30 having a liquid tight fit in the shock absorber housing 21. Secured to the valve slide 30 is one end of an arm 32, and movably connected to the other end of said arm 32 is a rod 31 adapted to be actuated from the driver's seat. It is obvious that by turning the valve slide 30 the liquid flow between the chambers 23 and 24 may be more or less restricted, such variation being suitable to fit varying conditions of road, load or speed.

The cross shaft 20 is flexibly connected with the vehicle springs 8 and 9 in the following manner. Arranged close to each of the bushings 18 and 19 is a flexible coupling 35 and 36, respectively. With reference especially to Fig. 3 each coupling comprises an inner hub 37 loosely mounted on cross shaft 20 and an outer hub 38 keyed to said shaft 20 and enclosing the inner hub 37. Each hub has four radial diametrically opposed webs or vanes, the vanes 39 of the inner hub 37 being set at an angle of fortyfive degrees in relation to the vanes 40 of the outer hub 38. The eight spaces between the vanes is filled up with a cushioning material, for instance a one-piece rubber block 43. Bolted to the inner hub 37 of each coupling 35 and 36, respectively, is a lever 33 and 34, respectively, connected to the corresponding spring clip plate 12 or 13, respectively, by means of a ball-jointed link 44 and 45, respectively.

The flexible couplings 35 and 36 protect the apparatus from being damaged by very sudden shocks and also render the stabilizing and spring controlling action of the apparatus smoother and less jerky.

The stabilizing action of the apparatus described above may be most clearly illustrated by an example. Suppose, for instance, that the vehicle shown in Figs. 1 and 2 takes a curve turning to the left at a relatively high speed. The centrifugal force set up by the curve causes a tendency of the frame and body to lean over to the right, whereby spring 8 on the righthand side is compressed, causing a relative movement between the frame side member 14 and the spring clip plate 12 towards one another. By this movement link 44 will push the outer end of lever 34 upwardly, thereby turning cross shaft 20 anti-clockwise (as seen in Fig. 2). This will cause lever 33 on the lefthand side to turn upwardly, thereby also pulling link 45 upwardly. The result will be that the frame side member 15 on the lefthand side of the vehicle will be pulled downwardly, compressing spring 9 to exactly the same degree as spring 8 was compressed by the centrifugal force at the previous moment.

From the above example it will be readily understood that a relative movement in either direction between the frame side member and the axle at one side of the vehicle will immediately bring about an exactly similar movement on the opposite side, i. e., the frame and the axle will always move in parallel to one another. The leaning over of the body and frame of the vehicle, i. e. the sideswaying will thereby be rendered impossible, thus eliminating the most common reason for skidding. As skidding is the cause of a large percentage of automobile accidents, the importance of this stabilizing action is readily understood.

Simultaneously with the stabilizing action the spring controlling action of the apparatus is obtained by the resistance offered by the shock absorber attached to the cross shaft 20 to rapid movements between the frame and the axle in connection with the compression or rebound movements of the vehicle springs. It is obvious that any type of double-acting shock absorber may be used for this purpose, my invention being not restricted to double-acting shock absorbers of the oscillating vane type as used in the embodiment of my invention shown in Fig. 1 and 2.

In Fig. 4 a slightly modified embodiment of my invention is shown in which parts also seen in Figs. 1 and 2 are designated by the same reference numerals. Two double-acting adjustable hydraulic shock absorbers 46 and 47 of the oscillating vane type and principally of the same construction as shock absorber 21 shown in Figs. 1 and 2 are each bolted to the inside of one of the frame side members 14 and 15, respectively, in such a way that their vane shafts 48 and 49, respectively, are exactly coaxial. Surrounding said vane shafts 48 and 49 with a close fit is a hollow cross shaft 50 firmly keyed and bolted to vane shaft 49 but connected to vane shaft 48 by means of a flexible coupling 51 principally of the same construction as flexible coupling 36 shown in Fig. 3, the inner hub of said coupling 51 being keyed to the vane shaft 48 whereas the outer hub 38 thereof is keyed to the tubular cross shaft 50. The levers 33 and 34 are attached to the vane shafts 48 and 49, respectively. The shock absorbers 46 and 47 are adjustable from the drivers seat by means of rods 31a and 31b actuating a rotary valve in each shock absorber in the manner described with reference to Figs. 1 and 2.

It is readily understood that the stabilizing and spring controlling action of this latter embodiment of my invention is practically the same as that of the first embodiment, the difference between the two embodiments consisting chiefly in the first embodiment having one shock absorber and two flexible couplings while the latter embodiment has two shock absorbers and one flexible coupling.

It is obvious that the principal element of my new stabilizing and spring controlling device is the cross shaft transmitting the relative movements between frame and wheel on one side of the vehicle to similar movements between said parts on the other side. Therefore, in a vehicle in which two wheels are each provided with a shock absorber such spring controlling means may be converted to a stabilizing and spring controlling device according to the present invention by connecting the two shock absorbers by means of a cross bar, for instance in the manner illustrated in Fig. 4. Obviously, such modification or rebuilding will fall under the scope of my present invention.

In the two embodiments of my invention, described above, the cross shaft is shown journalled in the frame side members and connected with the wheel carrying members or springs by means of levers and ball-jointed links. It is obvious that the cross shaft may instead be mounted on the wheel carrying members or the springs and connected with the frame by means of levers and links. Such a construction will, of course, come within the scope of this invention.

In the two embodiments of the present invention described in the foregoing levers 33 and 34 are connected with the rear axle by means of ball-jointed links. It is obvious that these links may be dispensed with and the levers 33 and 34 may either be movably connected directly with the axle or be firmly attached to it, for instance by bolts, rivets or by welding. In the former case the vehicle springs must have spring shackles at both ends so they can move freely. In the latter case spring shackles at both ends are also necessary and in addition the end tubes of the rear axle housing must be journalled in the spring seats, so that the axle can turn independently of the springs.

Having thus described my invention, what I claim and desire to protect by Letters Patent is:

1. In a vehicle having two opposed frame side members and two opposed wheels each carrying a frame side member and each carried by a wheel carrying member permitting relative movements between the frame side member and the wheel, means to transmit a relative movement between the frame side member and the wheel on one side of the vehicle to a similar movement of the same direction and magnitude between the frame side member and the wheel on the other side of the vehicle, said means comprising a shock absorber, a flexible coupling and a cross shaft mounted to turn in one kind of such members and movably connected to the other kind of such members.

2. In a vehicle having a pair of oppositely disposed wheels suspended beneath a frame, stabilizing mechanism comprising in combination hydraulic shock absorber means restricting vertical movement of the wheels, said shock absorber means having a movable portion, and flexible means transmitting vertical motion of the wheels to the movable portion of the shock absorber means to restrict lateral tilting of the body relative to a line extending across the surfaces engaged by the wheels.

3. In a vehicle having a pair of oppositely disposed wheels suspended beneath a body, stabilizing mechanism comprising shock absorber means restricting vertical movement of the wheels, a pair of relatively movable means connected one with each wheel and the body, and a flexible driving connection between the pair of means.

4. In a vehicle having a frame and an axle connected by spring means, stabilizing mechanism between the axle and frame comprising in combination shock absorber means, and means interconnected with the shock absorber means restricting lateral tilting of the body relative to the axle, said interconnected means having a rigid portion and a flexible portion.

5. In a vehicle having a frame and an axle connected by spring means, stabilizing mechanism comprising shaft means rotatably carried by the body, shock absorber means having one portion fixed to the body and another portion fixed to the shaft, and a pair of connections between the shaft means and opposite ends of the axle, said connections having a limited degree of movement relatively.

6. In a vehicle having a frame and an axle connected by spring means, stabilizing mechanism between the frame and axle limiting lateral tilting of the frame relative to the axle and relative vertical movement of the body and axle comprising spaced means fixed to end portions of the axle, shock absorber means having a portion fixed to the frame and a movable portion, and flexible connecting means between the shock absorber means and the means fixed to the axle.

7. In a vehicle having an axle connected with a frame by a pair of longitudinally extending springs, stabilizing mechanism between the axle and the frame comprising a shaft rotatably mounted on the frame, a shock absorber having a portion fixed to the frame and another portion fixed to the shaft, arms fixed to the axle, and a flexible coupling between each arm and the shaft.

8. In a vehicle having an axle connected with a frame by a pair of longitudinally extending springs, stabilizing mechanism between the axle and the frame comprising a shaft consisting of two parts mounted to rotate relatively, a pair of shock absorbers each having a portion fixed to the frame and another portion fixed to one of the shaft parts, a flexible coupling between the two parts of the shaft, and arms having one end attached to the axle and the other end fixed to one of the shaft parts.

9. In a vehicle having a connected axle and frame with spring means interposed therebetween, stabilizing mechanism between the axle and frame comprising a shaft consisting of two parts mounted to rotate relatively, a pair of hydraulic shock absorbers each having a portion fixed to the frame and another portion fixed to one of the shaft parts, a flexible coupling between the two parts of the shaft, and arms each having one end attached to the axle and the other end fixed to one of the shaft parts.

10. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a pair of shock absorbers each having a movable section, a shaft intermediate the movable sections of the shock absorbers, and a flexible connection between the movable sections of the shock absorbers and the shaft.

11. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a shaft mounted to move with the load supporting means, a pair of means connected one to each wheel and adapted to be rotated upon vertical movement thereof, and a flexible coupling between each rotatable means and the shaft.

12. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a rotatable shaft mounted to move with the load supporting means, a pair of means connected one to each wheel and adapted to be rotated upon vertical movement thereof, and a flexible coupling between each rotatable means and the rotatable shaft.

13. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a pair of shock absorbers arranged on opposite sides of the load supporting means and each having a portion fixed thereto and a rotatable portion, a rotatable shaft mounted to move with the load supporting means, a pair of means connected one to each wheel and one to each shock absorber movable portion, said means being adapted to be rotated upon vertical movement of the associated wheel, and a flexible coupling between each rotatable means and the shaft.

14. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a rotatable shaft mounted to move with the load supporting means, a pair of means connected one to each wheel and adapted to be rotated upon vertical movement thereof, and a rubber connection between each rotatable means and the shaft.

15. In a vehicle having load supporting means and two opposed wheels each carried by a wheel carrying member permitting relative movements between the load supporting means and the wheels, means to transmit a relative movement between the load supporting means and the wheel on one side of the vehicle to a restrained movement in the same direction between the load supporting means and the wheel on the other side of the vehicle comprising a rotatable shaft mounted to move with the load supporting means, a pair of means connected one to each wheel and adapted to be rotated upon vertical movement thereof, and an interacting coupling device intermediate said pair of means, said device including compressible and expansible means retarding the movement of one of the pair of means relative to the other.

KARL GUSTAF ALFRED BÄCKDAHL.